(12) United States Patent
Bian et al.

(10) Patent No.: US 11,722,728 B2
(45) Date of Patent: Aug. 8, 2023

(54) DATA PROCESSING METHOD AND DEVICE

(71) Applicant: LONTIUM SEMICONDUCTOR CORPORATION, Anhui (CN)

(72) Inventors: Hui Bian, Anhui (CN); Shenghui Bao, Anhui (CN); Jin Su, Anhui (CN); Sai Gao, Anhui (CN); Xuansheng Zhu, Anhui (CN)

(73) Assignee: LONTIUM SEMICONDUCTOR CORPORATION, Hefei (CN)

( * ) Notice: Subject to any disclaimer, the term of this patent is extended or adjusted under 35 U.S.C. 154(b) by 0 days.

(21) Appl. No.: 17/410,985

(22) Filed: Aug. 24, 2021

(65) Prior Publication Data
US 2022/0385971 A1 Dec. 1, 2022

(30) Foreign Application Priority Data
May 25, 2021 (CN) .......................... 202110572128.5

(51) Int. Cl.
*G06F 12/00* (2006.01)
*H04N 21/44* (2011.01)
(Continued)

(52) U.S. Cl.
CPC ... *H04N 21/44008* (2013.01); *G06F 12/0811* (2013.01); *G06F 12/0835* (2013.01);
(Continued)

(58) Field of Classification Search
CPC .............. G06F 12/0806; G06F 12/0808; G06F 12/0811; G06F 12/0813; G06F 12/0815;
(Continued)

(56) References Cited

U.S. PATENT DOCUMENTS 5,619,501 A * 4/1997 Tamer ................ H04N 21/4181
348/E7.063
7,339,993 B1 * 3/2008 Brooks .......... H04N 21/440281
375/240.1
(Continued)

FOREIGN PATENT DOCUMENTS

CN 104349205 A 2/2015
CN 108449567 A 8/2018
(Continued)

OTHER PUBLICATIONS

First Office Action dated Dec. 16, 2022, regarding Chinese Application No. 202110572128.5.

*Primary Examiner* — Arvind Talukdar
(74) *Attorney, Agent, or Firm* — Harness, Dickey & Pierce, P.L.C.

(57) ABSTRACT

A data processing method is applied to a digital interface, which includes: reading data cached by a data source, where the data source includes a video source and an auxiliary data source; outputting video data, if the video data cached by the video source is not empty, where when the video data is output, corresponding position marks are at start and end positions of a frame structure of the video data and at start and end positions of a row structure of the video data; and outputting auxiliary data, if the video data cached by the video source is empty, the auxiliary data cached by the auxiliary data source is not empty and the frame structure or the row structure of the video data has been output, where when the auxiliary data is output, corresponding position marks are at a start position and an end position of the auxiliary data.

10 Claims, 4 Drawing Sheets

Data cached by a data source is read, and the data source includes a video source and an auxiliary data source — S10

If video data cached by the video source is not empty, the video data is output, where when the video data is output, corresponding position marks are at start and end positions of a frame structure of the video data and at start and end positions of a row structure of the video data — S20

If the video data cached by the video source is empty, auxiliary data cached by the auxiliary data source is not empty and the frame structure or the row structure of the current video data has been output, the auxiliary data is output, where when the auxiliary data is output, corresponding position marks are at the start position and the end position of the auxiliary data — S30

(51) Int. Cl.
*G06F 12/0811* (2016.01)
*G06F 12/0831* (2016.01)
*G06F 12/0897* (2016.01)
*H04L 1/00* (2006.01)
*H04N 21/433* (2011.01)
*H04N 21/435* (2011.01)
*H04N 21/438* (2011.01)
*H04N 21/442* (2011.01)

(52) U.S. Cl.
CPC ........ *G06F 12/0897* (2013.01); *H04L 1/0051* (2013.01); *H04N 21/435* (2013.01); *H04N 21/4331* (2013.01); *H04N 21/4383* (2013.01); *H04N 21/44209* (2013.01)

(58) Field of Classification Search
CPC .............. G06F 12/0817; G06F 12/082; G06F 12/0822; G06F 12/0824; G06F 12/0826; G06F 12/0828; G06F 12/0831; G06F 12/0833; G06F 12/0835; G06F 12/0837; G06F 12/084; G06F 12/0842; G06F 12/0897; G06F 2212/283; G06F 2212/284; G06F 2212/285; G06F 2212/286

See application file for complete search history.

(56) References Cited

U.S. PATENT DOCUMENTS

2011/0110648 A1* 5/2011 Sakaniwa ................ H04N 5/76
    386/338
2017/0223349 A1   8/2017 Cheng et al.
2020/0382803 A1  12/2020 Zhang et al.

FOREIGN PATENT DOCUMENTS

| | | |
|---|---|---|
| CN | 111669645 A | 9/2020 |
| CN | 111726634 A | 9/2020 |
| EP | 3806477 A1 | 4/2021 |

* cited by examiner

DATA PROCESSING METHOD AND DEVICE

This application claims the priority to Chinese Patent Application No. 202110572128.5, titled "DATA PROCESSING METHOD AND DEVICE", filed on May 25, 2021 with the China National Intellectual Property Administration, the disclosure of which is hereby incorporated by reference in its entirety.

FIELD

The present disclosure relates to the technical field of communication, and particularly, to a data processing method and a data processing device.

BACKGROUND

MIPI or LVDS interfaces are widely used as internal interfaces of mobile devices such as cameras and displays. The mobile device usually has a small size, so a distance between the internal interfaces of the devices is short and the internal interfaces are connected in a very compact manner.

At present, in many application environments, mobile devices have a large space and a distance up to tens of meters. For example, a remote communication system, an intelligent transportation system and an autonomous driving system in an automotive application need to display signals detected by peripheral devices such as a camera, a radar, and a sensor on a main control display over a distance up to tens of meters.

Therefore, how to pack these multipath signals and achieve interconnection through an interface and a transmission row that can be extended by tens of meters have become urgent problems to be solved.

SUMMARY

In view of this, a data processing method and a data processing device are provided according to the present disclosure to solve the above problems. Technical solutions are as follows.

A data processing method, applied to a digital interface, includes:

reading data cached by a data source, wherein the data source includes a video source and an auxiliary data source;

outputting video data, in a case that the video data cached by the video source is not empty, wherein when the video data is output, corresponding position marks are at a start position and an end position of a frame structure of the video data and at a start position and an end position of a row structure of the video data; and outputting auxiliary data, in a case that the video data cached by the video source is empty, the auxiliary data cached by the auxiliary data source is not empty, and the frame structure or the row structure of the video data has been output, wherein when the auxiliary data is output, corresponding position marks are at a start position and an end position of the auxiliary data.

In an embodiment, a bandwidth of the digital interface is greater than a bandwidth of the video source, the method further includes:

in a case that the video data cached by the video source is empty and the auxiliary data cached by the auxiliary data source is not empty, stopping reading from the video source and outputting the auxiliary data; and starting to read from the video source after an output of the auxiliary data ends.

In an embodiment, a processing priority of the auxiliary data source is higher than a processing priority of the video source, the method further includes:

in a case that the video data cached by the video source is not empty and the auxiliary data cached by the auxiliary data source is not empty, outputting the auxiliary data; and outputting the video data after an output of the auxiliary data ends; and in a case that the video data cached by the video source is empty and the auxiliary data cached by the auxiliary data source is not empty, outputting the auxiliary data.

In an embodiment, the digital interface is connected to a time-sequence control circuit of FEC encoding, and the method further includes:

if a control signal of the time-sequence control circuit is received, stopping outputting the video data and/or the auxiliary data and responding the control signal; and continuing outputting the video data and/or the auxiliary data after a response of the control signal ends.

In an embodiment, the auxiliary data source includes an audio source and other auxiliary data source;

correspondingly, the outputting the auxiliary data includes:

outputting audio data cached by the audio source and data cached by the other auxiliary data source, in a manner of alternately outputting of the audio source and the other auxiliary data source.

In an embodiment, the method further includes:

outputting the video data and/or the auxiliary data according to the number of channels.

A data processing device includes:

a data reading module configured to read data cached by a data source, wherein the data source includes a video source and an auxiliary data source; and a data outputting module configured to output video data, in a case that the video data cached by the video source is not empty, wherein when the video data is output, corresponding position marks are at a start position and an end position of a frame structure of the video data and at a start position and an end position of a row structure of the video data; and output auxiliary data, in a case that the video data cached by the video source is empty, auxiliary data cached by the auxiliary data source is not empty, and the frame structure or the row structure of the video data has been output, wherein when the auxiliary data is output, corresponding position marks are at a start position and an end position of the auxiliary data.

In an embodiment, a bandwidth of the digital interface is greater than a bandwidth of the video source, the data outputting module is further configured to:

in a case that the video data cached by the video source is empty and the auxiliary data cached by the auxiliary data source is not empty, stop reading from the video source and output the auxiliary data; and start to read from the video source after an output of the auxiliary data ends.

In an embodiment, a processing priority of the auxiliary data source is higher than a processing priority of the video source, the data outputting module is further configured to:

in a case that the video data cached by the video source is not empty and the auxiliary data cached by the auxiliary data source is not empty, output the auxiliary data, and output the video data after an output of the auxiliary data ends; and in a case that the video data cached by the video source is empty and the auxiliary data cached by the auxiliary data source is not empty, output the auxiliary data.

In an embodiment, the digital interface is connected to a time-sequence control circuit of FEC encoding, and the data outputting module is further configured to:

if a control signal of the time-sequence control circuit is received, stop outputting the video data and/or the auxiliary data and respond the control signal; and continue to output the video data and/or the auxiliary data after a response for the control signal ends.

Compared with the conventional technology, beneficial effects achieved by the present disclosure are as follows.

In the data processing method and device provided in the present disclosure. The data cached by the video source and the data cached by the auxiliary data source can be respectively represented by different special sequences. Specifically, for the video data cached by the video source, the start position and the end position of the frame structure or the start position and the end position of the row structure have corresponding position marks. For the auxiliary data cached by the auxiliary data source, the start position and the end position also have corresponding position marks. Further, when there is video data, the video data can be output in time; when there is no video data but there is auxiliary data, the auxiliary data can be output between the frame structures of the video data or between the row structures of the video data, so that the auxiliary data can be output in time. Based on the present disclosure, different special sequences can be used to represent different types of data, multiple types of data can be received and sent through one digital interface, transmission with each number of channels can be supported, and bandwidth utilization can be improved.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are merely some embodiments of the present disclosure. For those of ordinary skill in the art, other drawings can be obtained according to the provided drawings without paying creative labor.

DETAILED DESCRIPTION

The technical solution according to the embodiments of the present disclosure will be described clearly and completely as follows in conjunction with the accompany drawings in the embodiments of the present disclosure. It is obvious that the described embodiments are only a part of the embodiments according to the present disclosure, rather than all of the embodiments. All the other embodiments obtained by those skilled in the art based on the embodiments in the present disclosure without any creative work belong to the scope of protection of the present disclosure.

The present disclosure will be described in detailed as follows in conjunction with the drawings and the specific implementation mode, so that purposes, characteristics and advantages of the present disclosure can be more obvious and understandable.

A solution for data processing is provided according to the present disclosure. Based on the solution, the digital interface can pack multiple types of data for transmission on one channel, so as to realize a protocol of the digital interface for timely transmitting audio and video and improve bandwidth utilization.

Figure 1:
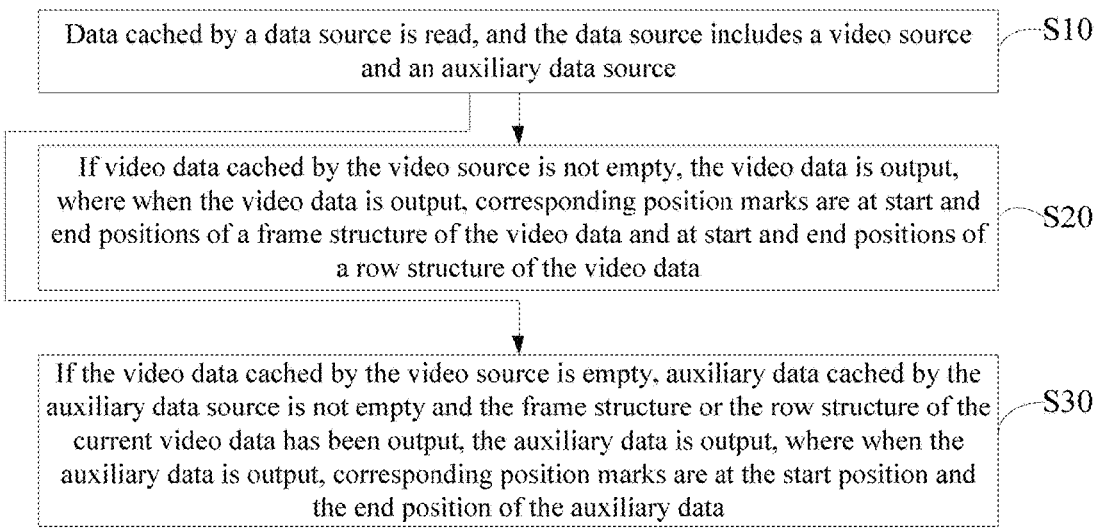
FIG. 1 is a flow chart of a data processing method according to an embodiment of the present disclosure.

Referring to FIG. 1, a data processing method is shown. The method is applied to the digital interface, and the method includes following steps S10 to S30.

In step S10, data cached by a data source is read. The data source includes a video source and an auxiliary data source.

In an embodiment of the present disclosure, the data source is divided into the video source and a non-video source, that is, the auxiliary data source. The auxiliary data source may include an audio source, a video parameter source, an interrupt source, an Inter-Integrated Circuit (I2C) unidirectional data source, which will not be limited in the embodiment of the present disclosure.

It should be noted that data cached by the audio source is audio data, data cached by the video parameter source is a video parameter, data cached by the interrupt source is an interrupt status, and data cached by the I2C unidirectional data source is I2C unidirectional data.

In addition, in a practical application, each data source has a corresponding cache area afifo, and each data source writes data cached by itself into its own afifo.

In step S20, if video data cached by the video source is not empty, the video data is output. When the video data is output, corresponding position marks are at a start position and an end position of a frame structure of the video data and at a start position and an end position of a row structure of the video data.

In an embodiment of the present disclosure, when there is a video data stream, the video data stream is packaged into a digital protocol layer in time. When there is no video stream, auxiliary data can be inserted.

In an embodiment, as long as the video data cached by the video source is not empty, the video data is output. When the video data is output, corresponding position marks are provided at a start position and an end position of the frame structure of the video data and a start position and an end position of the row structure of the video data. That is, a frame start mark AVS is inserted at the start of a frame of the video data, and a frame end mark AVE is inserted at the end of the frame; a row beginning mark ABE is inserted at the start of a row of the video data, and a row end mark ABS is inserted at the end of the row.

Figure 2:
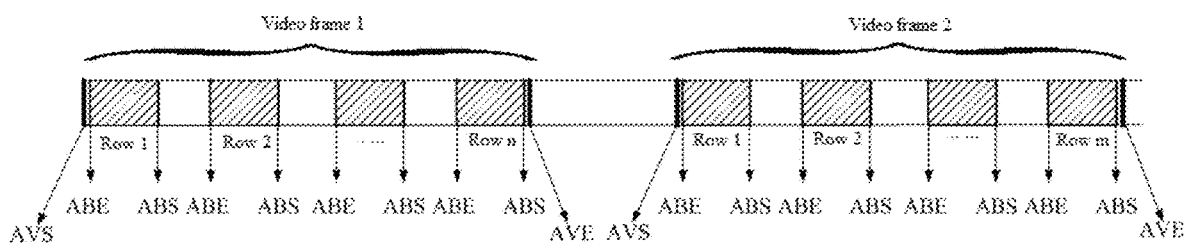
FIG. 2 is a schematic diagram of marks of video data according to an embodiment of the present disclosure.

It should be noted that one frame of video data has multiple rows. With reference to FIG. 2, a schematic diagram of marks when two frames of video data are output is shown. It can be seen that a time slot for inserting the auxiliary data is between the row structures and between the frame structures.

In step S30, if the video data cached by the video source is empty, auxiliary data cached by the auxiliary data source is not empty and the frame structure or the row structure of the current video data has been output, the auxiliary data is output. When the auxiliary data is output, corresponding position marks are at the start position and the end position of the auxiliary data.

In an embodiment of the present disclosure, a bandwidth of the digital interface is usually greater than a bandwidth of the video source. That is, an output speed of the video source is lower than a reading speed of the digital interface. When the video source does not cache the video data and the auxiliary data source caches the auxiliary data, it can be considered to insert the auxiliary data into the video data, so as to improve bandwidth utilization of the digital interface. That is, the auxiliary data is inserted between the row structures of the video data or between the frame structures of the video data and output.

Figure 3:
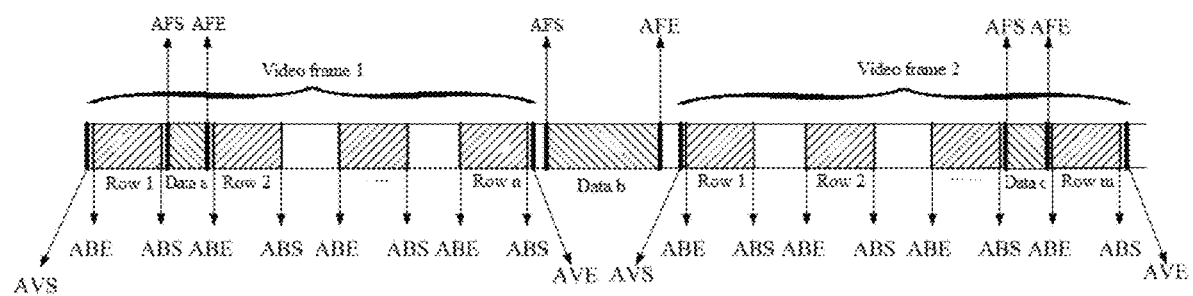
FIG. 3 is a schematic diagram of marks of auxiliary data according to an embodiment of the present disclosure.

In an embodiment, when the auxiliary data is output, the start and end positions of the auxiliary data are respectively set with corresponding position marks. That is, the start mark AFS of the auxiliary data is inserted at the start position of the auxiliary data, and the end mark AFE of the auxiliary data is inserted at the end position of the auxiliary data. Continuing to take FIG. 2 as an example, a schematic diagram of inserting and outputting the auxiliary data between the frame structures and between multiple row structures are illustrated in FIG. 3. The auxiliary data is represented by data a, b, and c.

It should be noted that different types of the auxiliary data can be represented by different marks. Specifically, for the auxiliary data such as the audio data, the video parameter, and the interrupt status, a data start mark can be ASS, and a data end mark can be ASE. A data definition can be added after ASS and ASE to distinguish different types. For example, "8'h00" indicates the audio data, "8'h01" indicates the video parameter, and "8'h02" indicates the interrupt status. It should be noted that a data definition of other auxiliary data such as I2C unidirectional data can also be set by the user, which will not be limited in the present disclosure.

Figure 4:
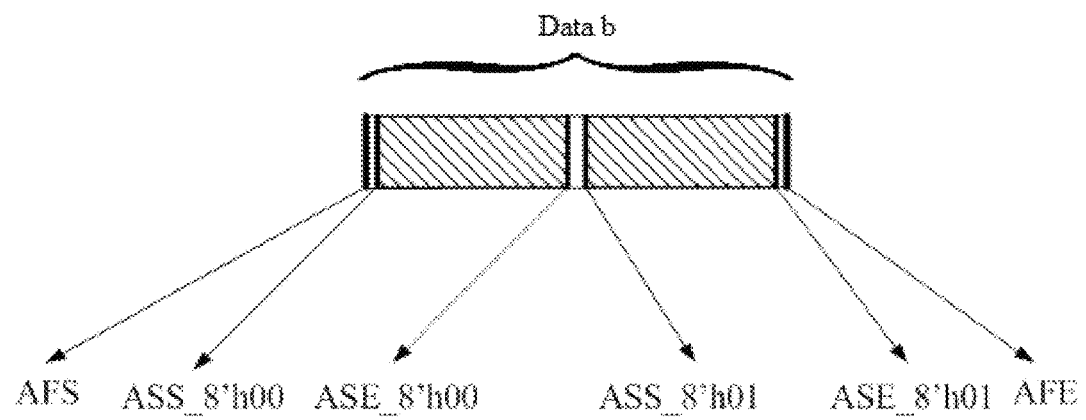
FIG. 4 is a schematic diagram of auxiliary data according to an embodiment of the present disclosure.

Continuing to illustrate with the auxiliary data b in FIG. 3, the auxiliary data b may include the same type of auxiliary data, or may include multiple types of auxiliary data. Generally, the video parameter is often used to describe one frame of the video data. Therefore, the auxiliary data b often includes the video parameter. Assuming that the auxiliary data b further includes the audio data, the schematic diagram is illustrated in FIG. 4.

In some other embodiments, when the bandwidth of the digital interface is relatively redundant, that is, when the bandwidth of the digital interface is greater than the bandwidth of the video source by a certain multiple, the auxiliary data can be inserted if all video data has been read out. The video data starts to be transmitted again after the transmission of the auxiliary data ends. Specifically, on the basis of the data processing method illustrated in FIG. 1, the method further includes:

if the video data cached by the video source is empty and the auxiliary data cached by the auxiliary data source is not empty, stopping reading from the video source and outputting the auxiliary data, and starting to read from the video source after the output of the auxiliary data ends.

In an embodiment of the present disclosure, taking the auxiliary data containing the audio data as an example, if the video source does not cache video data but the audio source caches the audio data, the reading of the video data can be paused at this time, and the audio data starts to be output. The mark AFS is inserted first, and then a mark ASS_8'h00, the audio data, a mark ASE_8'h00, and the mark AFE are inserted in sequence.

In addition, except the audio source, the auxiliary data source can further include other source such as the video parameter source. In this case, the video parameter source caches the video parameter. After the output of the audio data ends and before the reading of the video source starts, the video parameter can be output. The output of the video parameter can refer to that of the audio data. That is, the mark AFS is inserted first, and then a mark ASS_8'h01, the video parameter, a mark ASE_8'h01, and the mark AFE are inserted in sequence. Of course, the video parameter can be output next time when the video data cached by the video source is empty, which will not be limited in the embodiment of the present disclosure.

Conversely, a processing priority of the video parameter source is higher than a processing priority of the audio source. When the video data is not cached at the first time and the video parameter and the audio data are cached at the same time, the video parameter is transmitted after the reading of the video source is stopped, and then the video data is read again after the transmission of the video parameter ends. When the video data is not cached at the second time, the audio data is transmitted after the reading of the video source is stopped. The video data is read again after the transmission of the audio data ends.

In addition, the audio data and the video parameter can be output together. That is, when the audio data and the video parameter are output, the mark AFS is inserted first, and then the mark ASS_8'h00, the audio data, the mark ASE_8'h00, the mark ASS_8'h01, the video parameter, the mark ASE_8'h01, and the mark AFE are inserted in sequence. In this way, the audio data and the video parameter can be output in one auxiliary data. In other words, the auxiliary data is not limited to the transmission of only one data type, it can contain data of multiple types, and transmission priority of different data types can be set in the transmission process.

In some other embodiments, the auxiliary data source may include the audio source and other auxiliary data source such as the video parameter source, and the I2C unidirectional data source. In order to prevent an audio stream from being interrupted, in a process of outputting the auxiliary data, the audio data and data cached by other auxiliary data source can be alternately output by the audio source and the other auxiliary data source.

Taking the auxiliary data source including the video parameter source and the I2C unidirectional data source as an example, the auxiliary data can be output in an order of the audio data, the video parameter, the audio data, the I2C unidirectional data, the audio data, the video parameter, the audio data, and the I2C unidirectional data . . . .

In other embodiments, for individual application scenarios, the processing priority of some auxiliary data sources, such as the interrupt source, is higher than the processing priority of the video source. In this case, if the video data is being transmitted, the transmission can be paused and the auxiliary data of the auxiliary data source can be inserted. Specifically, on the basis of the data processing method illustrated in FIG. 1, the method further includes:

if the video data cached by the video source is not empty and the auxiliary data cached by the auxiliary data source is not empty, outputting the auxiliary data, and outputting the video data after the output of the auxiliary data ends; and if the video data cached by the video source is empty and the auxiliary data cached by the auxiliary data source is not empty, outputting the auxiliary data.

In an embodiment of the present disclosure, the transmission of the interrupt status can refer to that of the audio data or the video parameter. That is, the mark AFS is inserted first, and then a mark ASS_8'h02, the interrupt status, a mark ASE_8'h02, and the mark AFE are inserted in sequence.

In this way, it can be ensured that an auxiliary data stream with a high processing priority is not interrupted.

In some other embodiments, the digital interface preferentially responds to a processing algorithm with a fast response demand, such as Forward Error Correction (FEC) encoding algorithm. When the digital interface is connected to a time-sequence control circuit of FEC encoding, on the basis of the data processing method illustrated in FIG. 1, the method further includes:

if a control signal of the time-sequence control circuit is received, stopping outputting the video data and/or the auxiliary data and responding the control signal; and continuing to output the video data and/or the auxiliary data after the response of the control signal ends.

In an embodiment of the present disclosure, the FEC operates, that is, the time-sequence control circuit of FEC encoding outputs the control signal. The digital interface detects the control signal, and responds to the control signal. The output of the video data and/or the auxiliary data pauses. After the response is finished, the video data and/or the auxiliary data continue to be output. The control signal includes a PM mark of the FEC, namely APM. The digital interface can execute the response by identifying the APM.

In addition, a protocol of the digital interface implemented by the embodiment of the present disclosure can support one channel and multiple channels, and the number of channels will not be limited. The video data and/or the auxiliary data are output according to the number of channels.

A sorting relationship between the number of channels and the data may refer to a table below.

| The number of channels | Lane0 | Lane1 | ... | LaneN-1 |
|---|---|---|---|---|
| 1 | Position mark Byte(n) Position mark | | | |
| 2 | | Position mark byte(2n)     byte(2n + 1) Position mark | | |
| N | | | Position mark byte(n*N)   byte(n*N) + 1   ...   byte(n*N) + N − 1 Position mark | |

It should be noted that when the digital interface sequentially transmits the video data and/or the auxiliary data on each channel, one byte of data is transmitted each time. For the data transmitted on multiple channels, the position marks are provided at the start position and end position of the data in each channel.

Figure 5:
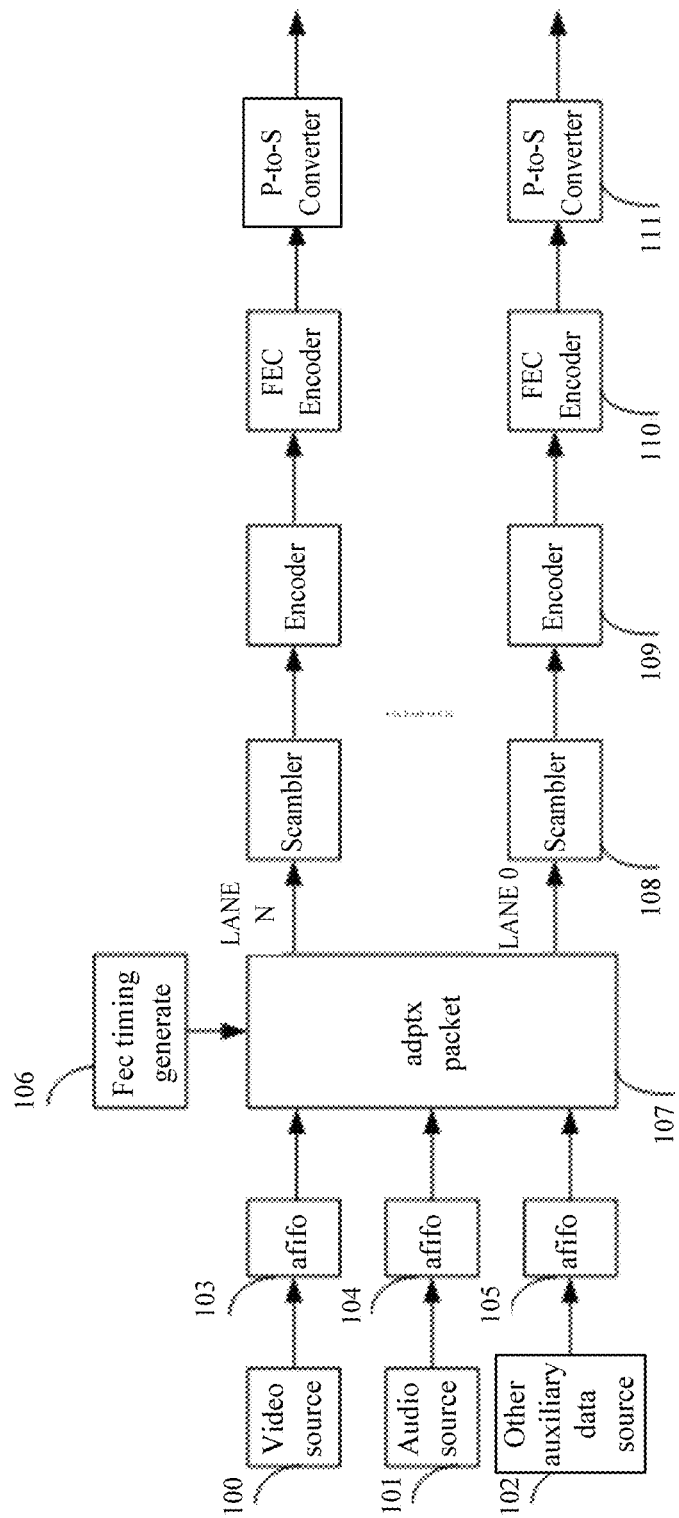
FIG. 5 is an implementation frame diagram of a protocol of a digital interface according to an embodiment of the present disclosure.

With reference to FIG. 5, an implementation frame diagram of a digital interface protocol is shown. Three channels of data are shown in FIG. 5, which includes data of a video source 100, an audio source 101, and other auxiliary data source 102. Each data source writes its data into its own afifo for caching.

No data is provided between the frame structures and between the row structures of video data cached by the video source 100 in afifo 103. At this time, the afifo 103 is empty. Adptx packet (i.e. the digital interface) 107 cannot read video data from the afifo 103. In this period, the audio source 101 writes audio data into afifo 104. In this case, the adptx packet 107 reads the audio data from the afifo 104, inserts AFS, ASS_8'h00 and then starts to transmit the audio data. When all audio data in the afifo 104 is read out, the packet 107 inserts ASE_8'h00 and AFE, to indicate the end of the transmission of the audio data.

In addition, in a period when the adptx packet 107 cannot read the video data from the afifo 103, the audio source 101 writes the audio data into the afifo 104, and other auxiliary data source 102 also writes other auxiliary data into afifo 105. The adptx packet 107 can selectively transmit the audio data and the other auxiliary data based on processing priorities of the audio data and the other auxiliary data; or alternately transmit the audio data and the other auxiliary data. In the transmission process, the audio data and the other auxiliary data are independent and complete, that is, the audio data and the other auxiliary data respectively have corresponding position marks at start and end positions thereof, start with ASS and end with ASE. Different data is distinguished according to types.

Furthermore, the video source 100 writes video data into the afifo 103, and the adptx packet 107 inserts AVS before the start of one frame of video data, then inserts the read video data, and inserts AVE after the end of the frame. In a process of inserting the video data, the ABE is inserted before the start of each row of data, then the row of the data is inserted, and the ABS is inserted after the end of the row. For the first row of the frame of data, it is necessary to insert the AVS and then insert the ABE. If the video data in the afifo 103 is empty when the row is not over but the auxiliary data can be read from the afifo 104 or afifo 105, AFS is inserted to indicate the start of the auxiliary data, and then the auxiliary data is inserted according to the type of the auxiliary data. When video data is stored in the afifo 103 again, AFE is inserted after the auxiliary data to indicate the end of the auxiliary data, and then the video data continue to be transmitted.

In addition, when the transmission of the adptx packet 107 for one frame of the video data is not finished, other auxiliary data source writes data into the afifo 105. If the processing priority of the other auxiliary data source is higher than the processing priority of the video source, the transmission of the video data in the afifo 103 is paused, the AFS is inserted, the ASS is inserted based on the type of the other auxiliary data, and then the other auxiliary data is inserted. Corresponding type of ASE is inserted after the other auxiliary data, and finally the AFE is inserted. After that, the video data in the afifo 103 continues to be transmitted.

The digital interface protocol in this technical solution supports FEC encoding, and FEC encoding has the highest processing priority. Thus, when FEC encoding is performed, all data transmission needs to be paused. When the time-sequence control circuit 106 of FEC encoding outputs the control signal, in a time sequence period of FEC encoding, the adptx packet 107 needs to pause all data transmission, and each data source caches its data in the afifo 103, 104, and 105 respectively.

The adptx packet 107 packs and outputs the three way data of the afifo 103, 104 and 105 to one or more channels. Channel Lane® in FIG. 5 first scrambles the data through Scramber module 108. The data output by the Scramber module 108 enters an Encoder module 109 for performing 8b10b encoding. The data output by the Encoder module 109 enters an FEC Encoding module 110 for performing FEC encoding. The data output by the FEC Encoding module 110 then enters P-to-S Converter 111 for performing a parallel-serial conversion and outputs to a physical interface. A processing flow of other channels is the same as that of Lane0, which will not be repeated herein.

It should be noted that an algorithm selected by the Scramber module 108 is Scrambling in Video Electronics Standards Association (VESA) DisplayPort (DP) Standard. The Encoder module 109 adopts the 8b10b encoding. K codes of the marks at each position and APM are illustrated in the table below. An algorithm of the FEC Encoding module 110 can be customized, as long as an operation of FEC encoding does not destroy an encoding characteristic of 8b10b.

|  | 8b10b k code |
| --- | --- |
| ABS | K28.5 |
| ABE | K27.7 |
| AFS | K30.7 |
| AFE | K23.7 |
| AVS | K28.2 |
| AVE | K29.7 |
| APM | K28.1 |
| ASS | K28.4 |
| ASE | K28.6 |

In summary, in one digital interface, multiple data sources can be distinguished based on different special sequences. Audio data and video data can be received, packaged, and transmitted in time, and a small cache is required. Additional status and information can be transmitted through the auxiliary data packet. The priority of the auxiliary data can be controlled in real time, and thus the auxiliary data can be transmitted in preference to the video data. For example, the interrupt status needs to be transmitted in time. Based on the design of this protocol, the data processing method can be applied flexibly.

Figure 6:
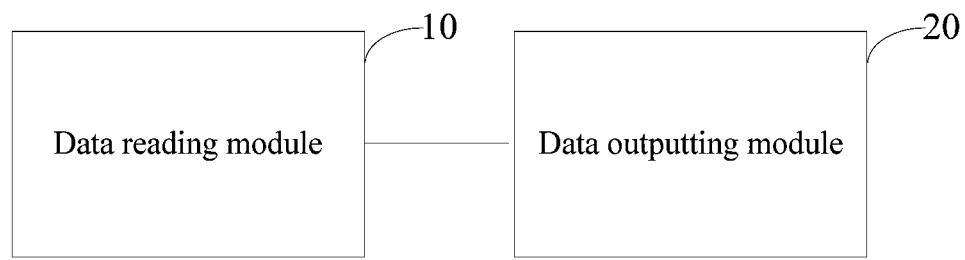
FIG. 6 is a structural diagram of a data processing device according to an embodiment of the present disclosure.

Based on the data processing method provided in the foregoing embodiments, a data processing device is provided according to an embodiment of the present disclosure. A structure diagram of the device is illustrated in FIG. 6. The data processing device includes a data reading module 10 and a data outputting module 20.

The data reading module 10 is configured to read data cached by a data source. The data source includes a video source and an auxiliary data source.

The data outputting module 20 is configured to output video data, if the video data cached by the video source is not empty, wherein when the video data is output, corresponding position marks are at a start position and an end position of a frame structure of the video data and at a start position and an end position of a row structure of the video data; and output auxiliary data, if the video data cached by the video source is empty, auxiliary data cached by the auxiliary data source is not empty and the frame structure or the row structure of the video data has been output, wherein when the auxiliary data is output, corresponding position marks are at a start position and an end position of the auxiliary data.

In an embodiment, a bandwidth of the digital interface is greater than a bandwidth of the video source, the data outputting module 20 is further configured to:

if the video data cached by the video source is empty and the auxiliary data cached by the auxiliary data source is not empty, stop reading from the video source and output the auxiliary data; and start to read from the video source after an output of the auxiliary data ends.

In an embodiment, a processing priority of the auxiliary data source is higher than a processing priority of the video source, the data outputting module 20 is further configured to:

if the video data cached by the video source is not empty and the auxiliary data cached by the auxiliary data source is not empty, output the auxiliary data, and output the video data after the output of the auxiliary data ends; and if the video data cached by the video source is empty and the auxiliary data cached by the auxiliary data source is not empty, output the auxiliary data.

In an embodiment, the digital interface is connected to a time-sequence control circuit of FEC encoding, and the data outputting module 20 is further configured to:

if a control signal of the time-sequence control circuit is received, stop reading the video data and/or the auxiliary data and respond the control signal; and continue to output the video data and/or the auxiliary data after a response for the control signal ends.

In an embodiment, the auxiliary data source includes an audio source and other auxiliary data source.

Correspondingly, the data outputting module 20 is further configured to:

output audio data cached by the audio source and data cached by the other auxiliary data source, in a manner of alternately outputting of the audio source and the other auxiliary data source.

In an embodiment, the data outputting module 20 is further configured to:

output the video data and/or the auxiliary data according to the number of channels.

The data processing device provided in the embodiments of the present disclosure can use different special sequences to represent different types of data, multiple types of data can be received and sent through one digital interface, transmission with each number of channels can be supported, and bandwidth utilization can be improved.

The data processing method and device according to the present application is described in detail hereinbefore. The principle and the embodiments of the present application are illustrated herein by specific examples. The above description of examples is only intended to help the understanding of the method and the spirit of the present application. It should be noted that, for those skilled in the art, according to the idea of the present application, there will be changes in the specific implementation and the scope of application. In summary, the content of this description should not be construed as a limitation to the present application.

It should be noted that the above embodiments in this specification are described in a progressive manner. Each of the embodiments is mainly focused on describing its differences from other embodiments, and references may be made among these embodiments with respect to the same or similar portions among these embodiments. Since device embodiments are similar to method embodiments, the description thereof is relatively simple, and reference may be made to the description of the method embodiments for relevant parts.

It should be noted that, in this specification, terms "include", "comprise" or any other variations are intended to cover non-exclusive "include", thus a process, a method, an object or a device including a series of factors not only include the listed factors, but also include other factors not explicitly listed, or also include inherent factors of the process, the method, the object or the device. Without more limitations, a factor defined by a sentence "include one . . . " does not exclude a case that there is another same factor in the process, the method, the object or the device including the described factor.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A data processing method, applied to a digital interface, comprising:
   reading data cached by a data source, wherein the data source comprises a video source and an auxiliary data source;
   outputting video data, in a case that a cache for the video source caches the video data, wherein when the video data is output, corresponding position marks are at a start position and an end position of a frame structure of the video data and at a start position and an end position of a row structure of the video data; and
   outputting auxiliary data, in a case that the cache for the video source does not cache the video data, a cache for the auxiliary data source caches the auxiliary data and the frame structure or the row structure of the video data has been output, wherein when the auxiliary data is output, corresponding position marks are at a start position and an end position of the auxiliary data.

2. The data processing method according to claim 1, wherein a bandwidth of the digital interface is greater than a bandwidth of the video source, the method further comprises:
   in a case that the video data cached by the video source is empty and the auxiliary data cached by the auxiliary data source is not empty, stopping reading from the video source and outputting the auxiliary data; and starting to read from the video source after an output of the auxiliary data ends.

3. The data processing method according to claim 1, wherein a processing priority of the auxiliary data source is higher than a processing priority of the video source, the method further comprises:
   in a case that the video data cached by the video source is not empty and the auxiliary data cached by the auxiliary data source is not empty, outputting the auxiliary data, and outputting the video data after an output of the auxiliary data ends; and
   in a case that the video data cached by the video source is empty and the auxiliary data cached by the auxiliary data source is not empty, outputting the auxiliary data.

4. The data processing method according to claim 1, wherein the digital interface is connected to a time-sequence control circuit of forward error correction (FEC) encoding, and the method further comprises:
   in a case that a control signal of the time-sequence control circuit is received, stopping reading the video data and/or the auxiliary data and responding the control signal; and continuing to output the video data and/or the auxiliary data after a response for the control signal ends.

5. The data processing method according to claim 1, wherein the auxiliary data source comprises an audio source and other auxiliary data source;
   the outputting the auxiliary data comprises:
   outputting audio data cached by the audio source and data cached by the other auxiliary data source, in a manner of alternately outputting of the audio source and the other auxiliary data source.

6. The data processing method according to claim 1, wherein the method further comprises:
   outputting the video data and/or the auxiliary data according to the number of channels.

7. A data processing device, comprising:
   a data reading module configured to read data cached by a data source, wherein the data source comprises a video source and an auxiliary data source; and
   a data outputting module configured to output video data, in a case that a cache for the video source caches the video data, wherein when the video data is output, corresponding position marks are at a start position and an end position of a frame structure of the video data and at a start position and an end position of a row structure of the video data; and output auxiliary data, in a case that the cache for the video source does not cache the video data, a cache for the auxiliary data source caches auxiliary data and the frame structure or the row structure of the video data has been output, wherein when the auxiliary data is output, corresponding position marks are at a start position and an end position of the auxiliary data.

8. The data processing device according to claim 7, wherein a bandwidth of the digital interface is greater than a bandwidth of the video source, the data outputting module is further configured to:
   in a case that the video data cached by the video source is empty and the auxiliary data cached by the auxiliary data source is not empty, stop reading from the video source and output the auxiliary data; and start to read from the video source after an output of the auxiliary data ends.

9. The data processing device according to claim 7, wherein a processing priority of the auxiliary data source is higher than a processing priority of the video source, the data outputting module is further configured to:
   in a case that the video data cached by the video source is not empty and the auxiliary data cached by the auxiliary data source is not empty, output the auxiliary data, and output the video data after an output of the auxiliary data ends; and
   in a case that the video data cached by the video source is empty and the auxiliary data cached by the auxiliary data source is not empty, output the auxiliary data.

10. The data processing device according to claim 7, wherein
    the digital interface is connected to a time-sequence control circuit of forward error correction (FEC) encoding, and the data outputting module is further configured to:
    in a case that a control signal of the time-sequence control circuit is received, stop reading the video data and/or the auxiliary data and respond the control signal; and continue to output the video data and/or the auxiliary data after a response for the control signal ends.

* * * * *